United States Patent
Durham et al.

(10) Patent No.: US 10,094,458 B2
(45) Date of Patent: Oct. 9, 2018

(54) TORQUE TRANSMITTING DEVICE

(71) Applicant: VALEO EMBRAYAGES, Amiens (FR)

(72) Inventors: Patrick Durham, Troy, MI (US); Alexandre Depraete, Bloomfield, MI (US)

(73) Assignee: Valeo Embrayages, Amiens (FR)

( * ) Notice: Subject to any disclaimer, the term of this patent is extended or adjusted under 35 U.S.C. 154(b) by 52 days.

(21) Appl. No.: 15/245,703

(22) Filed: Aug. 24, 2016

(65) Prior Publication Data

US 2018/0058561 A1    Mar. 1, 2018

(51) Int. Cl.
*F16H 45/02*     (2006.01)
*F16F 15/121*    (2006.01)

(52) U.S. Cl.
CPC ......... *F16H 45/02* (2013.01); *F16F 15/1215* (2013.01); *F16H 2045/0221* (2013.01)

(58) Field of Classification Search
None
See application file for complete search history.

(56) References Cited

U.S. PATENT DOCUMENTS

| | | | |
|---|---|---|---|
| 2,551,718 A | | 5/1951 | Auten |
| 4,145,936 A | | 3/1979 | Vincent et al. |
| 5,119,911 A | | 6/1992 | Bochot et al. |
| 5,667,042 A | * | 9/1997 | Olsen ............... F16H 45/02 |
| | | | 192/206 |
| 5,682,969 A | * | 11/1997 | Ling ............... F16H 45/02 |
| | | | 192/212 |
| 5,697,261 A | | 12/1997 | Mokdad et al. |
| 5,893,355 A | | 4/1999 | Glover et al. |
| 6,585,091 B2 | | 7/2003 | Reinhart et al. |
| 2003/0106763 A1 | | 6/2003 | Kimura et al. |
| 2015/0369296 A1 | | 12/2015 | Lopez-Perez |

FOREIGN PATENT DOCUMENTS

| | | |
|---|---|---|
| DE | 19729421 A1 | 1/1998 |
| DE | 19919449 A1 | 11/1999 |
| DE | 10017801 A1 | 10/2001 |
| DE | 102004024747 A1 | 12/2005 |
| EP | 1048420 A2 | 11/2000 |
| EP | 1460313 A2 | 9/2004 |

(Continued)

*Primary Examiner* — Jacob S. Scott
(74) *Attorney, Agent, or Firm* — Berenato & White, LLC (57) ABSTRACT

A torque transmitting device comprising a torque input element intended to be coupled to a crankshaft of an engine, a torque output element intended to be coupled to a transmission input shaft, damping means mounted between the torque input element and the torque output element, with the torque output element being able to pivot relative to the torque input element about an axis, against a resisting torque exerted by the damping means, with the damping means comprising at least one elastic leaf able to be elastically and radially held to rest on a support member, with the elastic leaf being adapted to bend upon rotation of the torque input element relative to the torque output element, with the device further comprising clutch means mounted between the torque input element and the torque output element, wherein the supporting member is carried by the torque input element.

19 Claims, 5 Drawing Sheets

(56) References Cited

FOREIGN PATENT DOCUMENTS

| | | |
|---|---|---|
| EP | 2824361 A1 | 1/2015 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2668234 | 4/1992 |
| FR | 2714435 A1 | 6/1995 |
| FR | 2828543 A1 | 2/2003 |
| FR | 2938030 A1 | 5/2010 |
| FR | 3000155 A1 | 6/2014 |
| FR | 3008152 | 1/2015 |
| FR | 3031367 A1 | 7/2016 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |

\* cited by examiner

TORQUE TRANSMITTING DEVICE

FIELD OF THE INVENTION

The present invention relates to a torque transmitting device, specifically for a motor vehicle, such as a torque converter, for instance.

BACKGROUND OF THE INVENTION

The patent FR 2 668 234, in the name of the Applicant, discloses a torque converter comprising an impeller wheel integral with a cover intended to be coupled to an engine crankshaft, with the impeller wheel being able to hydrokinetically drive the turbine wheel through the reactor.

The torque converter also comprises clutch means comprising a piston axially movable between an engaged position in which it is friction-coupled to the cover and a disengaged position in which it is uncoupled from the cover. The piston is connected to the hub through damping means. Said damping means comprise elastic springs acting circumferentially. The hub is intended to be coupled to a transmission input shaft. Besides, the turbine wheel is rotationally coupled to the hub.

Pressure chambers are provided on either side of the piston so that the latter is moved according to the pressure difference between said chambers.

In the disengaged position of the piston, the torque generated by the crankshaft is transmitted to the cover and to the impeller wheel, which hydrokinetically drives the turbine wheel through the reactor. The torque is then transmitted to the hub and to the transmission input shaft. The above-mentioned elastic damping means are not active in such an operating mode.

On the contrary, in the engaged position of the piston, the torque generated by the crankshaft is transmitted to the cover, and then to the piston friction-coupled to said cover. The torque is then transmitted to the hub and to the transmission input shaft, through the damping means.

Depending on the specifications, it may be necessary to have a normally closed torque converter, i.e. which, when in the engaged position, is in a so-called rest position in which the piston is not controlled. Reducing the duration of the clutch engaging phase, i.e. the time required to change from a disengaged position to an engaged position, may also be necessary. Increasing the torque which can be transmitted through the clutch may also be required.

Besides, the damping means used are relatively expensive, have a complex structure, i.e. a significant number of parts, and are cumbersome.

SUMMARY OF INVENTION

The invention more particularly aims at providing a simple, efficient and cost-effective solution to these problems.

For this purpose, it provides for a torque transmitting device comprising a torque input element intended to be coupled to a crankshaft of an engine, a torque output element intended to be coupled to a transmission input shaft, damping means mounted between the torque input element and the torque output element, with the torque output element being able to pivot relative to the torque input element about an axis, against a resisting torque exerted by the damping means, with the device further comprising clutch means mounted between the torque input element and the torque output element, characterized in that the damping means comprise at least one elastic leaf able to be elastically and radially held to rest on a support member, with said elastic leaf being adapted to bend upon rotation of the torque input element relative to the torque output element, with the supporting member being carried by the torque input element.

Such damping means enable a progressive damping, which results in a reduction in the vibrations generated in operation and a good quality of filtration.

Besides, such clutch means have a little complex structure, and require few parts. The overall dimensions of such structure are then reduced.

The torque input element may comprise a cover at least partly accommodating the damping means and the clutch means, with the supporting member being carried by the cover.

The stresses exerted on the supporting member by the elastic leaves can thus be taken up by the cover, so as to improve the operation of the damping means.

The supporting member may comprise a rolling body mounted to pivot about a shaft fixed to or formed by the cover.

The shaft can be welded to the cover, for instance by friction welding.

The clutch means comprise a piston axially movable from an engaged position in which the torque input element is rotationally coupled to the torque output element through the damping means, and a disengaged position.

The device may comprise assistance means able to exert an axial stress tending to return the piston to the engaged position thereof.

The assistance means make it possible to return the piston to the engaged position, so that the device is of the normally closed type. Besides, the assistance means increase the axial stress exerted onto the piston, so that the torque which can be transmitted through the clutch means is more important than in the case of the prior art. The clutch engaging time is also reduced.

Besides, pressures on either side of the piston can be balanced, so that the latter is not significantly deformed. The thickness, mass and overall dimensions of the piston can thus be reduced.

The assistance means may be elastic means able to exert an elastic return stress.

In this case, the assistance means may consist of at least one washer elastically deformable in the axial direction.

The washer may be a Belleville type washer, for instance.

The device may comprise a supporting flange able to be rotationally friction-coupled to the piston in the engaged position and able to be rotationally uncoupled relative to the piston in the disengaged position, with the elastic leaf being fixed to the supporting flange.

The device may comprise a supporting flange able to be rotationally friction-coupled to the piston in the engaged position and able to be rotationally uncoupled relative to the piston in the disengaged position, with the elastic leaf being fixed to the supporting flange and the supporting member being carried by the torque input element, or vice versa.

In this case, the piston and/or the supporting flange may comprise friction lining able to cooperate with the flange, respectively the piston, so as to provide a rotational friction coupling.

The piston may be rotationally coupled to the torque output element.

The friction lining may be positioned at the radially external periphery of the piston and/or the supporting flange, which makes it possible to further reduce the risk for the piston to be deformed.

The device may also comprise a turbine wheel and an impeller wheel rotationally coupled to the torque input element and able to hydrokinetically drive the turbine wheel.

The device thus forms hydrokinetic torque coupling means.

The device may further comprise a reactor, with the impeller wheel being adapted to hydrokinetically drive the turbine wheel through the reactor.

It should be noted that a hydrokinetic torque coupling device may be a torque converter when the hydrokinetic torque coupling means comprise an impeller wheel, a turbine wheel and a reactor, or may be a coupler when the hydrokinetic torque coupling means have no reactor.

The torque output element may comprise a central hub.

The central hub may comprise inner ribs able to cooperate with ribs on the transmission input shaft so as to provide a rotational coupling of said central hub with the transmission input shaft.

The invention may also comprise one or more of the following characteristics:

- the rolling body is a roller, for instance a cylindrical one,
- the rolling body is mounted on the shaft through a bearing, such as for instance a ball bearing, or a needle bearing,
- the shaft is fixed to the torque input element by welding for instance, more particularly by friction welding,
- the device comprises a supporting cage comprising two spaced partitions, with the shaft comprising a first and a second axial ends engaged into openings having a shape matching that of the cage partitions, with the shaft further comprising an axially median part whereon the leaf can bear, positioned between the two cage partitions. The shaft is thus not cantilevered, and the stresses can be taken up at each end of the shaft,
- the cage is fixed to the torque input element or to the torque output element, respectively, more particularly the cover,
- the cage may consist, at least partly, of the torque input element or to the torque output element, respectively,
- the leaves are fixed to the supporting flange by riveting or welding,
- the supporting flange comprises centring means on the torque input element,
- the supporting flange comprises an axial part, the radially internal periphery of which is provided with a cylindrical rim centred about a cylindrical centring part, consisting, for instance, of a pin of the torque input element, specifically a pin fixed to the cover,
- the piston comprises centring means on the torque output element,
- the piston comprises a radial part, the radially internal periphery of which is provided with a cylindrical rim centred about a cylindrical centring part of the torque output element, consisting, for instance, of a cylindrical part of the central hub,
- the cover comprises a first portion connected to the impeller wheel and a second portion carrying the supporting member, with the first and second portions being fixed together, for instance by welding,
- the impeller wheel, the turbine wheel and the reactor are at least partly accommodated in the cover,
- the elastic leaf is so designed that, in the engaged position, in a relative angular position between the torque input element and the torque output element different from a rest position, the supporting member exerts a bending stress on the elastic leaf causing a cross reaction force of the elastic leaf on the supporting member, with such cross reaction force having a circumferential component which tends to move back the torque input element and the torque output element toward said relative rest position,
- the elastic leaf is so designed that, in the engaged position, in a relative angular position between the torque input element and the torque output element different from a rest position, the supporting member exerts a bending stress on the elastic leaf causing a cross reaction force of the elastic leaf on the supporting member, with such reaction force having a circumferential component which tends to move back the torque input element and the torque output element toward said relative rest position,
- in the engaged position, the angular displacement of the torque input element relative to the torque output element is greater than 20° and preferably greater than 40°,
- the elastic leaf comprises a fastening portion and an elastic portion comprising a radially internal strand, a radially external strand and a bowed or bent portion connecting the internal strand and the external strand,
- the damping means comprise at least two elastic leaves, with each leaf being associated with and elastically held to rest on a supporting member, with each elastic leaf being able to bend upon rotation of the torque input element relative to the torque output element, in the engaged position.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENTS

Figure 1:
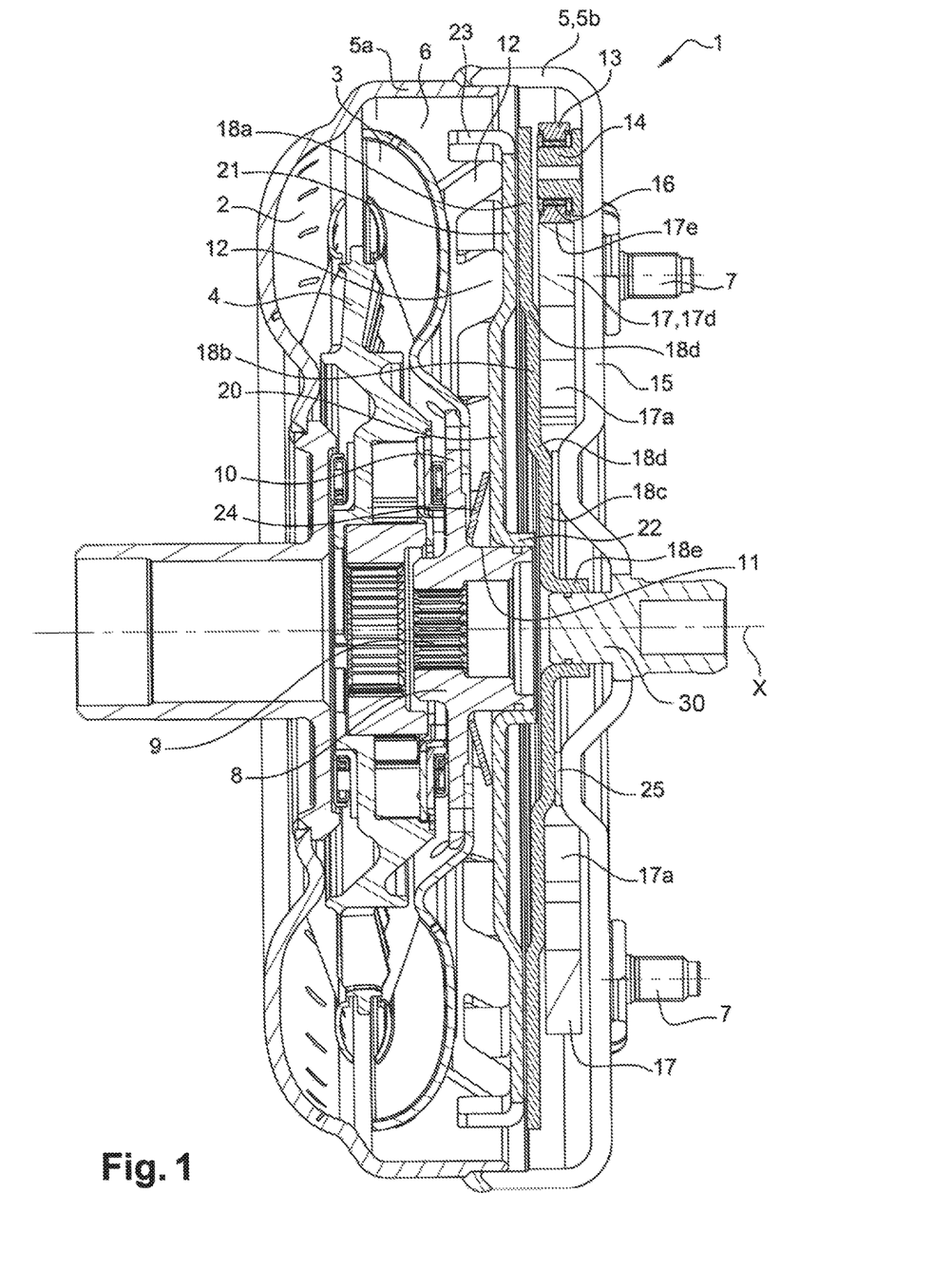
FIGS. 1 and 2 are axially sectional views of a torque converter according to a first embodiment of the invention.
Figure 2:
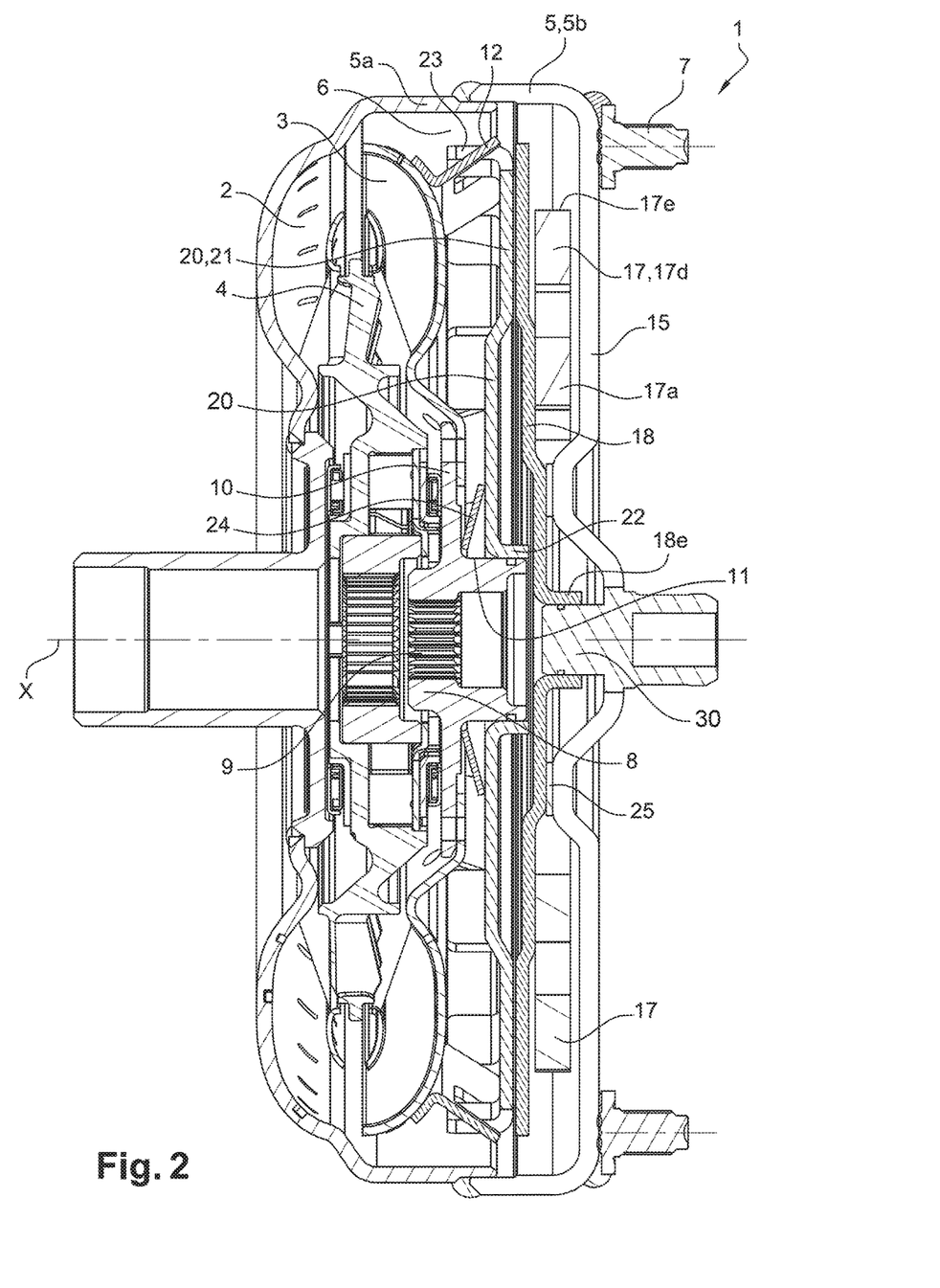

FIGS. 1 to 2 illustrate a torque converter according to a first embodiment of the invention. Such device makes it possible to transmit a torque from the output shaft of an internal combustion engine in a motor vehicle, such as for instance a crankshaft, to a transmission input shaft. The axis of the torque converter 1 bears reference X.

In the following, the words "axial" and "radial" are defined relative to the X axis.

The torque converter 1 comprises an impeller bladed wheel 2, able to hydrokinetically drive a turbine bladed wheel 3 through a reactor 4.

The impeller wheel 2 is fastened to a cover 5 consisting of two bell-shaped parts 5a, 5b assembled together by welding and defining an internal volume 6 accommodating the impeller wheel 2, the turbine wheel 3 and the reactor 4. Said cover also more generally referred to as the cover 5, comprises fastening means 7 making it possible to rotationally couple said cover 5 with the crankshaft.

The torque converter 1 further comprises a central hub 8, having an X axis, the radially internal periphery of which comprises ribs 9 and accommodated in the internal volume 6 of the cover 5. The central hub 8 comprises an annular rim 10 which radially extends outwards, and a cylindrical portion 11 positioned in front of the rim 10, i.e. on the right in FIGS. 1 and 2.

The turbine wheel 3 is fastened to the annular rim 10 of the central hub 8, for instance by rivets or by welding. The turbine wheel 3 also comprises coupling fingers or lugs 12 which axially extend frontwards, at an angle or not relative to the X axis.

The turbine wheel 3, the coupling lugs 12 and the central hub 8 may consist of one or more different parts without the operation of the torque converter being affected since such parts are fixed together.

Two supporting members or rolling bodies 13 shaped as rollers or cylindrical rollers, are mounted on the cover 5 and accommodated in the internal volume 6.

Figure 3:
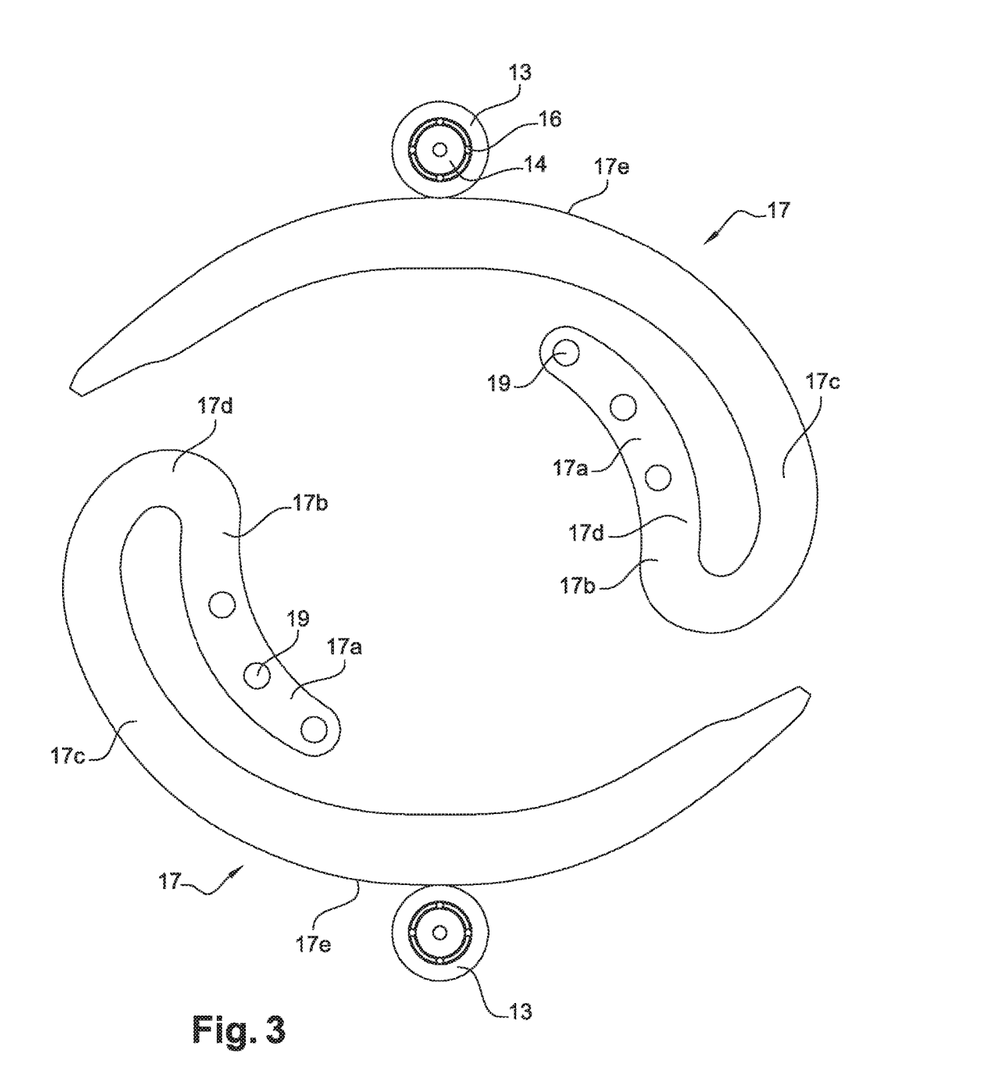
FIG. 3 is an axially sectional view of a part of a torque converter according to a second embodiment of the invention.

As illustrated in the embodiment FIG. 3, the rolling bodies 13 are so positioned as to be diametrically opposed. The rolling bodies 13 are mounted about shafts 14 which axially extend, with said shafts 14 being fixed to a front radial portion 15 of the portion 5b of the cover 5, for instance by friction welding. Other fastening means may be considered, of course, such as screws, or rivets, for instance, or by press-fitting into an opening of the cover 5. The rolling bodies 13 are mounted on the shafts 14 through rolling bearings 16, such as needle bearings, for instance.

The torque converter 1 further comprises two elastic leaves 17. As can be seen in FIG. 3, each elastic leaf 17 comprises a fastening portion 17a, which is fastened to an annular supporting flange 18 by rivets 19, here three in number for each leaf 17, and an elastic portion comprising a radially internal strand 17b, a radially external strand 17c, and a bowed or bent portion 17d connecting the internal strand 17b and the external strand 17c. The bowed or bent portion 17d has an angle of approximately 180°. In other words, the elastically deformable portion of the elastic leaf 17 comprises two regions radially shifted relative to each other and separated by a radial space. Such leaf 17 is for example known from document FR 3 008 152 in the name of the Applicant.

The radially external strand 17c develops on the circumference with an angle ranging from 120° to 180°. The radially external strand 17c comprises a radially external surface 17e which forms a raceway supported by the corresponding rolling body 13, with said rolling body 13 being positioned radially outside the radially external strand 17c of the elastic leaf 17. The raceway 17e has a globally convex shape. The raceway 17e may directly consist of a zone of the radially external strand 17c or of a part which is added onto the radially external strand 17c.

Between each elastic leaf 17 and the matching rolling body 21, the transmitted torque is broken down into radial stresses and peripheral stresses. Radial stresses make it possible for the matching blade 17 to bend and peripheral stresses make it possible for the matching rolling body 13 to move on the raceway 17e of the blade 17 and to transmit the torque.

The flange 18 is accommodated in the inner space 6 of the cover 5 and comprises a portion which radially extends and comprises a radially external area 18a, a radially median area 18b and a radially internal area 18c, axially shifted with respect to one another and connected by annular arched areas 18d, so as to give said radial portion some axial elasticity. The radially internal periphery of the radial portion of the flange 18 comprises a cylindrical rim 18e which extends frontwards, mounted about a rear cylindrical portion of a centring pin 30 having an X axis, fixed (i.e., non-moveably secured) on the cover 5. The pin 30 and the cover 5 may of course be a single part.

The torque converter 1 further comprises a clutch device adapted to non-rotatably couple the flange 18 and the hub 8, in an engaged position, and adapted to release the hub 8 of the flange 18, in a disengaged position.

The clutch device comprises an annular piston 20 which extends radially and is accommodated in the inner space 6 of the cover 5, the radially external periphery of which comprises a resting area 21 equipped with clutch lining and adapted to rest on the radially external area 18a of the flange 18, in an engaged position, so as to non-rotatably couple the flange 18 and the piston 20.

The radially external periphery of the piston 20 is provided with a cylindrical rim 22 extending forwards and mounted about the cylindrical portion 11 of the central hub 8 so that the piston 20 can axially slide along said cylindrical portion 11.

The radially external periphery of the piston 20 comprises coupling fingers or lugs 23 which axially extend backwards, and which are inserted into, or cooperate with the coupling fingers or lugs 12 of the turbine wheel 3 so as to non-rotatably couple the turbine wheel 3 and the piston 20, while enabling an axial displacement of the piston 20 relative to the turbine wheel 3.

The axial motion of the piston 20 is controlled by pressure chambers positioned on either side of the piston 20 between a disengaged position in which it is spaced from the flange 18 and an engaged position in which it is held to rest on the flange 18.

In order to facilitate the motion of the piston 20 toward the engaged position thereof, an assistance washer 24 elastically deformable in the axial direction, for instance a Belleville type washer, is mounted between the rim 10 of the hub 8 and the radial portion of the piston 20, about the cylindrical portion 11 of the hub 8. The washer 24 more particularly has a conical shape, with the radially internal periphery of the washer 24 resting on the rim 10, and with the radially external periphery of the washer 24 resting on the piston 20.

Such assistance washer 24 exerts a stress axially oriented frontwards on the piston 20, so that it is returned to its engaged position in which it rests on the flange 18. Thus, in the rest position, i.e. when the pressure in the pressure chambers positioned on either side of the piston 20 is globally balanced, the piston 20 returns to its engaged position. Such clutch device is thus of the normally closed type.

The assistance washer 24 also makes it possible to reduce the clutch engaging time, since the stress it exerts makes it possible to increase the piston 20 frontward motion speed, in the case of a clutch control. The stress exerted by the assistance washer 24 eventually makes it possible to increase the torque which can be transmitted through the clutch device.

The stress exerted by the assistance washer 24 ranges from 1000 to 8000 N, for instance, which makes it possible to reduce the clutch engaging time between 15% and 65%, from preference by approximately 40% and to increase the torque which can be transmitted through the clutch device between 5% to 70%, from preference by approximately 35%, as compared with the prior art.

Such clutch device makes it possible to transmit a torque from the crankshaft to the transmission input shaft, in a determined operation phase, without any action by the hydrokinetic coupling means consisting of the impeller wheel 2, the turbine wheel 3 and the reactor 4.

In operation, the torque from the crankshaft is transmitted to the cover 5 through the fastening means 7. In the disengaged position of the piston 20, the torque goes through the hydrokinetic coupling means, i.e. the impeller wheel 2 and then the turbine wheel 3 fixed to the hub 8. The torque is then transmitted to the transmission input shaft coupled to the turbine hub 8 through the internal ribs 9 of the hub 8.

In the engaged position of the piston 20, the torque from the cover 5 is transmitted to the flange 18 through a damping device formed by the elastic leaves 17 and by the supporting members 13. The torque is then transmitted to the hub 8 through the piston 20, and then to the transmission input shaft coupled to the hub 8 through the internal ribs 9 of the hub 8.

In the engaged position of the piston 20, when the torque transmitted between the cover 5 and the hub 8 varies, the radial stresses exerted between each elastic leaf 17 and the matching rolling body 13 vary and the bending of the elastic leaf 17 is modified. The modification in the bending of the leaf 17 comes with a motion of the rolling body 13 along the matching raceway 17e due to peripheral stresses.

The raceways 17e have profiles so arranged that, when the transmitted torque increases, the rolling bodies 13 each exert a bending stress onto the matching elastic leaf 17 which causes the free distal end of the elastic leaf 17 to move towards the X axis and a relative rotation between the cover 5 and the hub 8 such that the later move away from their relative rest position. Rest position means the relative position of the flange 5 relative to the hub 8, wherein no torque is transmitted between the latter.

The profiles of the raceways 17e are thus such that the rolling bodies 13 exert bending stresses having radial components and circumferential components onto the elastic leaves 17.

The elastic leaves 17 exert, onto the rolling bodies 13, a backmoving force having a circumferential component which tends to rotate the rolling bodies 13 in a reverse direction of rotation and thus to move back the turbine wheel 3 and the hub 8 towards their relative rest position, and a radial component directed outwards which tends to maintain the raceway 17e supported by the matching rolling body 13.

When the flange 5 and the hub 8 are in their rest position, the elastic leaves 17 are preferably radially pre-stressed toward the X axis so as to exert a reaction force directed radially outwards, so as to maintain the leaves 17 supported by the rolling bodies 13.

The profiles of the raceways 17e may equally be so arranged that the characteristic transmission curve of the torque according to the angular displacement is symmetrical or not relative to the rest position. According to an advantageous embodiment, the angular displacement may be more important in a so-called direct direction of rotation than in an opposite, so-called reverse direction of rotation.

The angular displacement of the cover 5 relative to the hub 8 may be greater than 20°, preferably greater than 40°.

The elastic leaves 17 are regularly distributed around the X axis and are symmetrical relative to the X axis so as to ensure the balance of the torque converter 1.

The torque converter 1 may also comprise friction means 25 so arranged as to exert a resisting torque between the cover 5 and the hub 8 during the relative displacement thereof so as to dissipate the energy stored in the elastic leaves 17. The friction means consist, for instance, of a friction ring 25 fixed to the cover 5 or to the flange 18 respectively, and able to rest on and rub the flange 18, or the cover 5 respectively.

Figure 4:
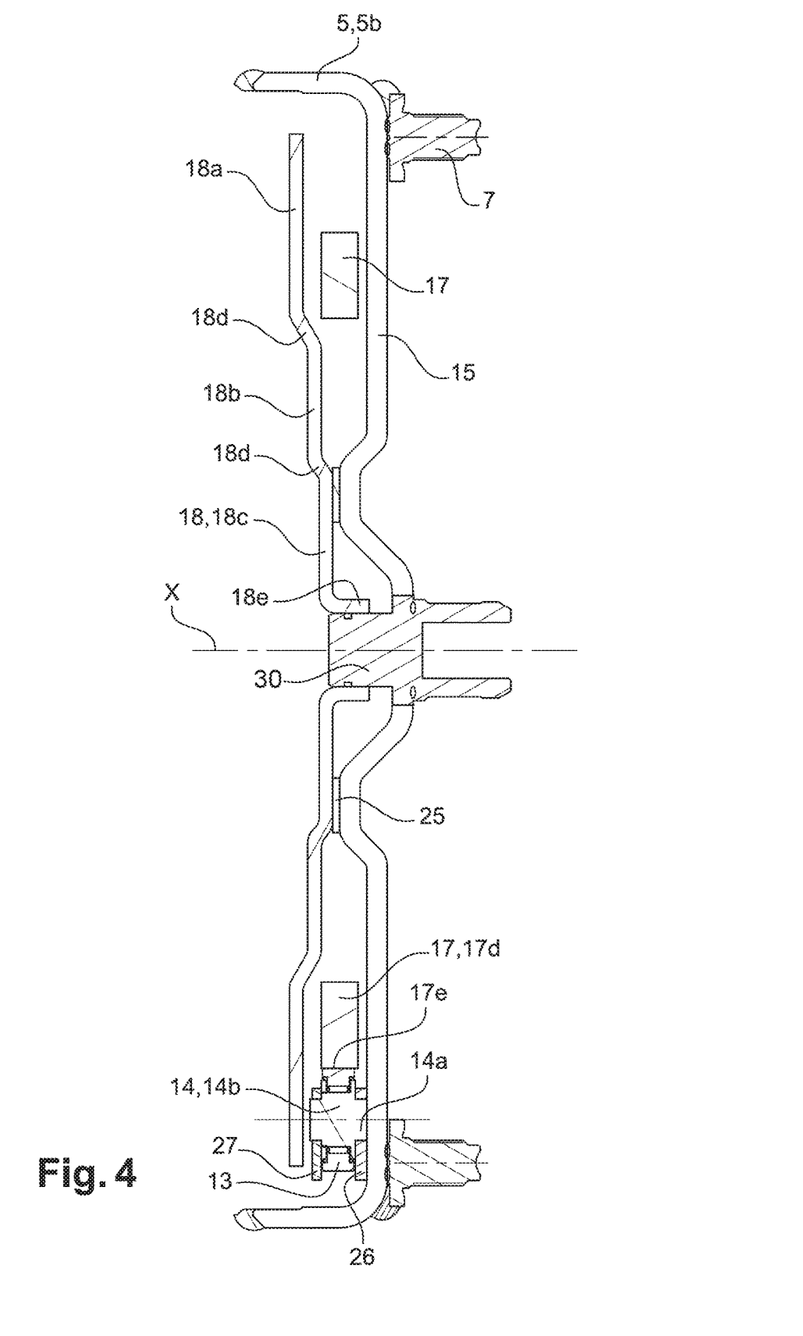
FIG. 4 is sectional view of a part of said torque converter according to a third embodiment of the invention.
Figure 5:
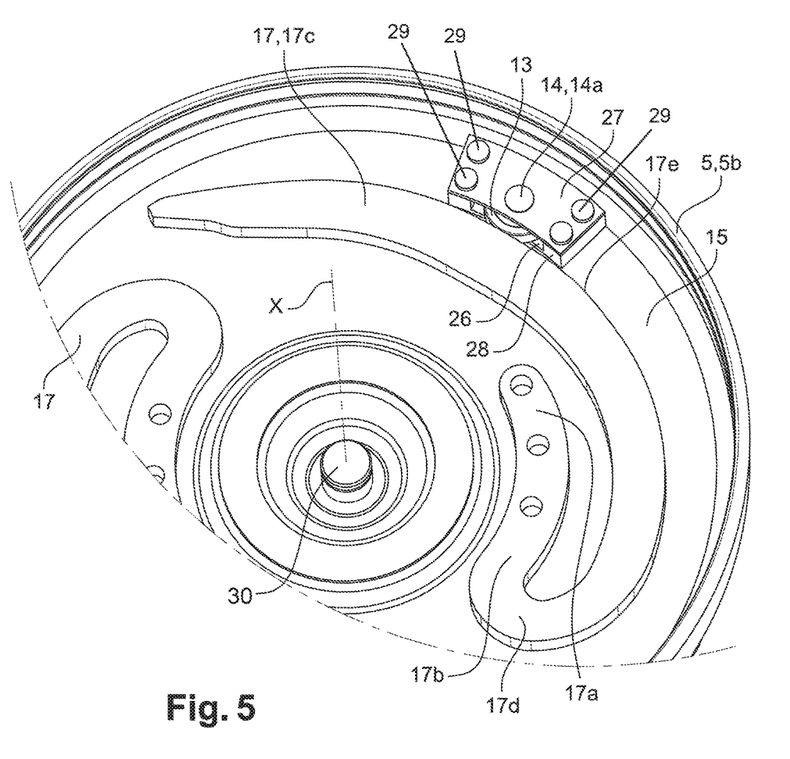
FIG. 5 is a perspective view of a part of said torque converter according to the third embodiment of the invention.

FIGS. 4 and 5 show a part of a torque converter 1 according to a third embodiment of the invention, which is different from the ones disclosed above while referring to FIGS. 1 to 3 in that the torque input element comprises a supporting cage comprising two spaced apart partitions 26, 27 connected together by axially extending spacers 28.

The spacers 28 may be provided as a single piece with one of the partitions 26, 27, as in the case shown in FIGS. 4 and 5.

The shaft 14 comprises a first and a second axial end 14a engaged into openings having a matching shape in the partitions 26, 27, with the shaft 14 further comprising an axially median portion 14b used for supporting the leaf 17 and axially located between the two partitions 26, 27. The shaft 14 is thus not cantilevered, and the stresses can be taken up at each end 14a of the shaft 14.

The partitions 26, 27 are fixed together and to the cover 5 by rivets 29.

The cage 26, 27, 28 may of course consist, at least partially, of the cover.

The operation of such a torque converter 1 is similar to the one disclosed above while referring to FIGS. 1 to 3.

The invention claimed is:

1. A torque transmitting device (1) comprising:
   a torque input element (5) configured to be coupled to a crankshaft of an engine
   a torque output element (8) configured to be coupled to a transmission input shaft;
   a damping device (13, 17) mounted between the torque input element (5) and the torque output element (8), the torque output element (8) configured to pivot relative to the torque input element (5) about an axis (X) against a resisting torque exerted by the damping device (13, 17); and
   a clutch device (20, 18) mounted between the damping device (13, 17) and the torque output element (8);
   the damping device (13, 17) operatively connected to the torque output element (8) through the clutch device (20, 18);
   the damping device comprising at least one elastic leaf (17) configured to be elastically and radially held to rest on a supporting member (13), the at least one elastic leaf (17) configured to bend upon rotation of the torque input element (5) relative to the torque output element (8), the supporting member (13) being carried by the torque input element (5).

2. The torque transmitting device (1) according to claim 1, wherein the torque input element comprises a cover (5) at least partly accommodating the damping device (13, 17) and the clutch device (20, 18), and wherein the supporting member is carried by the cover (5).

3. The torque transmitting device (1) according to claim 2, wherein the supporting member comprises a rolling body (13) so mounted as to pivot about a shaft (14) fixed to or formed by the cover (5).

4. The torque transmitting device (1) according to claim 1, wherein a shaft (14) is welded to the cover (5).

5. The torque transmitting device (1) according to claim 4, wherein the piston (20) is non-rotatably coupled to the torque output element (8).

6. The torque transmitting device (1) according to claim 1, wherein the clutch device comprises a piston (20) axially movable from an engaged position in which the torque input element (5) is coupled to the torque output element (8) through the damping means (13, 17), and a disengaged position.

7. The torque transmitting device (1) according claim 1, further comprising a turbine wheel (3) and an impeller wheel (2) non-rotatably coupled to the torque input element (5) and configured to hydrokinetically drive the turbine wheel (3).

8. A device (1) according to claim 7, further comprising a reactor (4), with the impeller wheel (2) configured to hydrokinetically drive the turbine wheel (3) through the reactor (4).

9. The torque transmitting device (1) according to claim 1, wherein the torque output element comprises a central hub (8).

10. The torque transmitting device (1) according to claim 2, wherein a shaft (14) is welded to the cover (5).

11. The torque transmitting device (1) according to claim 3, wherein a shaft (14) is welded to the cover (5).

12. The torque transmitting device (1) according to claim 2, wherein the clutch device comprises a piston (20) axially movable from an engaged position in which the torque input element (5) is rotationally coupled to the torque output element (8) through the damping means (13, 17), and a disengaged position.

13. The torque transmitting device (1) according to claim 3, wherein the clutch device comprises a piston (20) axially movable from an engaged position in which the torque input element (5) is coupled to the torque output element (8) through the damping means (13, 17), and a disengaged position.

14. The torque transmitting device (1) according to claim 4, wherein the clutch device comprises a piston (20) axially movable from an engaged position in which the torque input element (5) is coupled to the torque output element (8) through the damping means (13, 17), and a disengaged position.

15. A torque transmitting device (1), comprising:
a torque input element (5) configured to be coupled to a crankshaft of an engine;
a torque output element (8) configured to be coupled to a transmission input shaft;
a damping device (13, 17) mounted between the torque input element (5) and the torque output element (8), the torque output element (8) configured to pivot relative to the torque input element (5) about an axis (X) against a resisting torque exerted by the damping device (13, 17); and
a clutch device (20, 18) mounted between the torque input element (5) and the torque output element (8);
the damping device comprising at least one elastic leaf (17) configured to be elastically and radially held to rest on a supporting member (13), the at least one elastic leaf (17) configured to bend upon rotation of the torque input element (5) relative to the torque output element (8), the supporting member (13) being carried by the torque input element (5);
the clutch device comprising a piston (20) axially movable from an engaged position in which the torque input element (5) is coupled to the torque output element (8) through the damping means (13, 1), and a disengaged position;
the torque transmitting device (1) further comprising an assistance device (24) exerting an axial stress tending to return the piston (20) to the engaged position thereof.

16. The torque transmitting device (1) according to claim 15, wherein the assistance device (24) includes at least one washer (24) elastically axially deformable.

17. The torque transmitting device (1) according to claim 15, further comprising a supporting flange (18) friction-coupled to the piston (20) in the engaged position and configured to be rotationally uncoupled relative to the piston (20) in the disengaged position, and wherein the at least one elastic leaf (17) is fixed to the supporting flange (18).

18. The torque transmitting device (1) according to claim 16, further comprising a supporting flange (18) friction-coupled to the piston (20) in the engaged position and configured to be rotationally uncoupled relative to the piston (20) in the disengaged position, and wherein the at least one elastic leaf (17) is fixed to the supporting flange (18).

19. A torque transmitting device (1), comprising:
a torque input element (5) configured to be coupled to a crankshaft of an engine;
a torque output element (8) configured to be coupled to a transmission input shaft;
a damping device (13, 17) mounted between the torque input element (5) and the torque output element (8), the torque output element (8) configured to pivot relative to the torque input element (5) about an axis (X) against a resisting torque exerted by the damping device (13, 17); and
a clutch device (20, 18) mounted between the torque input element (5) and the torque output element (8);
the damping device comprising at least one elastic leaf (17) configured to be elastically and radially held to rest on a supporting member (13), the at least one elastic leaf (17) configured to bend upon rotation of the torque input element (5) relative to the torque output element (8), the supporting member (13) being carried by the torque input element (5);
the clutch device comprising: a piston (20) axially movable from an engaged position in which the torque input element (5) is coupled to the torque output element (8) through the damping means (13, 17), and a disengaged position; and
a supporting flange (18) configured to be friction-coupled to the piston (20) in the engaged position and configured to be rotationally uncoupled relative to the piston (20) in the disengaged position, the at least one elastic leaf (17) being fixed to the supporting flange (18).

* * * * *